United States Patent
Li et al.

(10) Patent No.: US 12,402,605 B2
(45) Date of Patent: Sep. 2, 2025

(54) PREDICTIVE CONTROL SYSTEM AND REGULATORY METHOD FOR TEMPERATURE OF LIVESTOCK HOUSE

(71) Applicant: CHINA AGRICULTURAL UNIVERSITY, Beijing (CN)

(72) Inventors: Baoming Li, Beijing (CN); Yang Wang, Beijing (CN); Weichao Zheng, Beijing (CN); Qin Tong, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 112 days.

(21) Appl. No.: 18/264,747

(22) PCT Filed: Jan. 30, 2022

(86) PCT No.: PCT/CN2022/075157
§ 371 (c)(1),
(2) Date: Aug. 8, 2023

(87) PCT Pub. No.: WO2022/166919
PCT Pub. Date: Aug. 11, 2022

(65) Prior Publication Data
US 2024/0000046 A1  Jan. 4, 2024

(30) Foreign Application Priority Data
Feb. 8, 2021 (CN) .......................... 202110170467.0

(51) Int. Cl.
*A01K 29/00* (2006.01)
*A01K 1/00* (2006.01)

(52) U.S. Cl.
CPC .......... *A01K 29/005* (2013.01); *A01K 1/0052* (2013.01); *A01K 1/007* (2013.01)

(58) Field of Classification Search
CPC .... A01K 29/005; A01K 1/0052; A01K 1/007; A01K 1/0047; A01K 29/00; A01K 45/00;
(Continued)

(56) References Cited

U.S. PATENT DOCUMENTS

2016/0120144 A1   5/2016   Kim et al.

FOREIGN PATENT DOCUMENTS

| CN | 204536850 | 8/2015 |
| CN | 104950948 | 9/2015 |

(Continued)

OTHER PUBLICATIONS

Yang Jiayi, "Study on early warning and regulation of Ecological Security of Coal Resource-based City", Jun. 2018, China.
(Continued)

*Primary Examiner* — Brian A Zimmerman
*Assistant Examiner* — Anthony D Afrifa-Kyei
(74) *Attorney, Agent, or Firm* — Kunzler Bean & Adamson

(57) ABSTRACT

A predictive control system and regulatory method for a temperature of a livestock house are provided. The predictive control system includes a temperature and humidity sensor, a breeding environment temperature dynamic requirement module, an environmental controller and an environmental regulation implementation mechanism, where the environmental controller is connected to the breeding environment temperature dynamic requirement module and the temperature and humidity sensor; the environmental regulation implementation mechanism is connected to the environmental controller and is configured to perform corresponding environmental regulation according to a command from the environmental controller. The regulatory method controls a temperature of a breeding environment based on a livestock breeding environment tempera-
(Continued)

ture dynamic setting model, a livestock breeding environment temperature prediction system based on a GM (1,1) model, and a grey predictive fuzzy system based on the GM (1,1) model.

5 Claims, 4 Drawing Sheets

(58) Field of Classification Search
CPC .......... G06N 3/045; G06N 3/063; G06N 3/08; G06N 5/048; G01D 21/02; G01K 13/00; G06F 13/4286; G06F 18/2414; G06F 18/23; G06F 18/24; G16Y 20/10; G16Y 40/10; G16Y 40/35; G05D 27/02; G05D 27/00; G05B 13/04; G05B 19/4186; G05B 19/02; G05B 19/418; G05B 19/4185; G01N 33/0062; G06Q 10/04; G06Q 50/02; Y02A 40/70
See application file for complete search history.

(56) References Cited

FOREIGN PATENT DOCUMENTS

| CN | 107491124 | | 12/2017 | |
|---|---|---|---|---|
| CN | 107491124 A | * | 12/2017 | ............ G05D 27/02 |
| CN | 108445747 | | 8/2018 | |
| CN | 107289998 | | 8/2019 | |
| CN | 110140662 | | 8/2019 | |
| CN | 113126676 A | * | 7/2021 | ............ G05D 27/02 |
| CN | 107203239 | | 7/2022 | |
| CN | 112817354 | | 6/2023 | |
| WO | 1996009576 | | 3/1996 | |

OTHER PUBLICATIONS

Zhu Jianping, et al., "Economic Forecasting and Decision-Making", Xiamen University Press, Jan. 2012, China.
Xuanyuan Zhong, et al., "A Study on Controlling System for the Animal Housing Environment Based on Fuzzy Neural Network", Journal of Inner Mongolia University (Natural Science Edition) vol. 44 No. 4, Jul. 2013, China.
Wang Xinzheng, et al., "Fuzzy Adaptive PID Control and Simulation for Poultry House Temperature", Forest Engineering, vol. 28, Mar. 2012, China.
Liu Yanchang, et al., "Fuzzy Monitoring System for Animal Building Environment Based on FPGA", Acta Ecolagiae Animalis Domastici, vol. 38, No. 10, Oct. 2017, China.
Li Lifeng, et al., "Monitoring and controlling system for delivery sow house environment based on configuration software and fuzzy control", Transactions of the CSAE, vol. 27, No. 6, Jun. 2011, China.
Chai Yu, et al. "Multifunctional Poultry House Environment Control System Design Based on Fuzzy PID Decoupling Algorithm", Acta Ecologiae Animalis Domastici, vol. 35, No. 10, Oct. 2014, China.
Ma Congguo, "Research on microclimate environment control system of domestic chicken houses", Jiangsu Province Agricultural Support Plan Project, Feb. 2015, China.
Ma Congguo, et al., "Research progress on domestic pig house microclimate environment control system", Jiangsu Agricultural Sciences, 2014, China.

* cited by examiner

PREDICTIVE CONTROL SYSTEM AND REGULATORY METHOD FOR TEMPERATURE OF LIVESTOCK HOUSE

CROSS REFERENCE TO RELATED APPLICATION

This patent application is a national stage of International Application No. PCT/CN2022/075157, filed on Jan. 30, 2022, which claims the benefit and priority of Chinese Patent Application No. 202110170467.0 filed with the China National Intellectual Property Administration on Feb. 8, 2021 and entitled "PREDICTIVE CONTROL SYSTEM AND REGULATORY METHOD FOR TEMPERATURE OF LIVESTOCK HOUSE". Both of the aforementioned applications are incorporated by reference herein in their entireties as part of the present application.

TECHNICAL FIELD

The present disclosure relates to the technical field of agricultural environmental control, and in particular, to a predictive control system and regulatory method for a temperature of a livestock house.

BACKGROUND

In a high-density and large-scale house feeding environment, a suitable breeding environment is a key factor influencing the health and productivity of the livestock and also the basis for guaranteeing the genetic potential and production efficiency of the livestock. Complicated and changeable climatic conditions, building facilities of a livestock house, ventilation flow distribution, and a feeding pattern may directly affect an indoor environment, leading to complicated and diversified indoor environments. A non-uniform thermal environment in a livestock house, a large temperature fluctuation amplitude, heat and cold stresses, and the like may affect the health, productivity, disease resistance, and feed conversion ratio of the livestock. A large-scale control system for the environment of a livestock house is a key to guarantee that conditions of the indoor environment satisfy the living environment of the livestock.

In recent years, domestic scholars have proposed new regulatory methods for a control system for a micro-climate environment in a livestock house, such as LI Lifeng, WU Pei et al. "Monitoring and Controlling System for Delivery Sow House Environment Based on Configuration Software and Fuzzy Control" (2011), WANG Xinzheng, HAN Yujie et al. "Fuzzy Adaptive PID Control and Simulation for Poultry House Temperature" (2012), XUAN Chuanzhong, WU Pei et al. "Study on Controlling System for the Animal Housing Environment Based on Fuzzy Neural Network" (2013), MA Congguo, HU Yingzhan et al. "Research Progress of Control System for Micro-Climate Environment of Hog House in China" (2014), CHAT Yu and YU Quangang "Multifunctional Poultry House Environment Control System Design Based on Fuzzy PID Decoupling Algorithm" (2014), MA Congguo, HU Yingzhan et al. "Study on Control System for Micro-Climate Environment of Chicken House in China" (2015), and LIU Yanchang, ZHANG Zhixia et al. "Fuzzy Intelligent Monitoring System for Animal Building Environment based on FPGA" (2017).

Existing control systems for livestock house environment mostly operate to monitor conditions of indoor environment by arranging sensors such as temperature and humidity sensors in the livestock house, compare a temperature at a certain point or an average temperature signal of several points in the livestock house monitored by the sensor with a set value in the livestock house, and then regulate the operation and switching of ventilation modes and the operation of a wet curtain cooling system and a heating device by regulatory strategies such as a control algorithm so as to regulate the micro-environment in the livestock house. Such control systems mainly apply regulatory strategies such as PID control, fuzzy control, neural network, and expert system control algorithms in environmental control systems for livestock houses. The application of such control systems for livestock house environment promotes the automation level of environmental regulation, causes the internal environment of the livestock house to be within a range relatively suitable for the growth of the livestock, reduces the manual labor intensity, increases the economic and social benefits of breeding, and facilitates the development of the livestock breeding industry.

However, with increasing raising scale of the livestock and in view of weak adaptability of the livestock of high-yield breeds to stresses such as temperature fluctuations of the breeding environment, further control is performed by determining whether temperature and humidity signals detected by fixed sensors in the livestock house meet environmental requirements in the livestock house. This is called a feedback environmental regulation method based on detection results of environmental parameters. The feedback environmental regulation method based on detection results of environmental parameters has the following problems:

(1) Regulated temperatures are limited values, real-time accurate regulation can be hardly realized, and thus the requirements for environmental temperatures at different growth stages cannot be met. Set values of the environmental temperature in the livestock house are generally several or a plurality of particular critical temperature values, and temperature values cannot be set scientifically according to requirements at different growth stages of the livestock.

(2) The environment in the livestock house can be hardly regulated in time with time lag and poor control efficiency. The environmental parameters at a point of time in the livestock house monitored by the sensors are fed back as indicators to regulate the environmental conditions in the livestock house at next point of time. Studies have shown that the thermal environmental system of the livestock house is dynamic, time-varying, uncertain, etc. A control quantity is determined according to a measurable controlled quantity, namely temperature information. For the complicated object, i.e., the environmental lag process of the livestock house, the variation of the controlled quantity cannot reflect the variation of the control quantity timely. Compared with the environmental conditions in the livestock house, environmental regulation strategies have obvious time lags and cannot be adjusted correspondingly by predicting the variation trend of the controlled quantity (i.e., the temperature), and the control efficiency is poor. The local environment in the livestock house is already out of a range suitable for the growth of the livestock, but signals received by the environmental regulation system are still within a suitable environmental range. The environmental regulation system fails to perform timely regulation, causing exposure of the livestock in the local environment in the livestock house to the heat and cold stress environment and easily leading to the occurrence of respiratory diseases.

(3) The accuracy of regulation is low. PID control is short in response time but high in overshoot, and a control system for the environmental temperature of a livestock house does not allow for excessive overshoot. For fuzzy control, step rise response is low in overshoot and long in response time, and step fall has negative overshoot. Moreover, the accuracy of the fuzzy control is not high enough and can only realize rough regulation of the livestock house environment. A self-regulatory strategy based on a neural network algorithm is adaptive to the changes of the livestock house environment, but requires expert experience.

(4) Preventive measures cannot be taken, the adaptability is poor, and the regulation quality is hard to guarantee. The climatic environment is complicated and changeable. Where the environmental temperature outside the livestock house decreases or increases sharply in a short time, feedback regulation by monitoring the environmental changes in the livestock house is incapable of a regulatory strategy before the environment changes sharply, and the influence of severe environment on the environment in the livestock house cannot be avoided completely, resulting in high cold and heat stresses, a large temperature fluctuation amplitude, and the like within a certain time in the livestock house. The accuracy of environmental regulation and strategies are limited to sensors in the livestock house and may be directly affected by the monitoring accuracy of the sensors in the livestock house, and exceptions of the sensors cannot be found timely and cannot be continuously used as input module of the control system.

(5) Energy conservation cannot be realized and the operation energy consumption is increased. The environment in the livestock house has non-linear characteristics. Studies have shown that with the feedback environmental regulation algorithm based on detection results of environmental parameters, there are many problems, such as system oscillation and overshoot, regulatory apparatuses such as fans for the livestock house operating in an overshoot manner, environmental control equipment being started and stopped for many times, etc., and the operation energy consumption is certainly increased in an environmental regulatory operation mode.

The environment outside the livestock house changes with time, and how to achieve the purposes such as no cold and heat stresses, a small temperature fluctuation amplitude, and uniform thermal environment in the livestock house through a feeding environmental regulation technique has become an important problem urgently needing to be solved in the livestock breeding industry.

Therefore, it is desirable to provide a predictive control system and regulatory method for a temperature of a livestock house that can solve the problems existing in the prior art.

SUMMARY

The present disclosure provides a predictive control system for a temperature of a livestock house. The predictive control system includes a temperature and humidity sensor, a breeding environment temperature dynamic requirement module, an environmental controller, and an environmental regulation implementation mechanism, where the environmental controller is connected to the breeding environment temperature dynamic requirement module and the temperature and humidity sensor; and the environmental regulation implementation mechanism is connected to the environmental controller and is configured to perform corresponding environmental regulation according to a command from the environmental controller.

Preferably, the environmental controller includes a data acquisition module, an environmental temperature prediction module, a predictive fuzzy control module, a predictive fuzzy decision-making module, and an early warning and overhauling module.

Preferably, the environmental temperature prediction module is connected to the data acquisition module, and is configured to output a predicted temperature of a breeding environment in a livestock house at time N based on a comprehensive grey model (GM) (1,1) integrated with accumulated generating operation (AGO) of a sequence, residual model correction, and equal-dimension new information processing;

the predictive fuzzy control module is connected to the environmental temperature prediction module, where input signals to the predictive fuzzy control module are a prediction error for the breeding environment temperature in the livestock house and a changing rate of the prediction error; a fuzzy decision-making rule is established to determine an output quantity for predictive fuzzy control, and the environmental regulation implementation mechanism is configured to perform control and regulation based on the output quantity for predictive fuzzy control;

the predictive fuzzy decision-making module is connected to the predictive fuzzy control module, where input signals to the predictive fuzzy decision-making module are an error of input and output and a changing rate of the error, and an appropriate prediction step is determined; and the early warning and overhauling module is configured to give an early warning based on a number of deviation accumulations, and is connected to the breeding environment dynamic temperature requirement module, the temperature and humidity sensor, and the data acquisition module.

Preferably, the breeding environment temperature dynamic requirement module is configured to output breeding environment temperature requirement parameters of the livestock at different growth stages based on parameters of a livestock breeding characteristic, a behavioral characteristic, a stress mechanism, a livestock breed, a quality, and an age in days, and is connected to the data acquisition module.

Preferably, the environmental regulation implementation mechanism includes a fan, a wet curtain, a small ventilation window, a heating apparatus, and a spraying device, and is configured to control ventilation, cooling, heating, and humidification of the breeding environment of the livestock according to commands from the environmental controller.

Preferably, the number of temperature and humidity sensors is more than or equal to two, which are disposed inside and outside the livestock house, respectively.

The present disclosure further provides a regulatory method for the predictive control system for a temperature of a livestock house. The regulatory method controls a temperature of a breeding environment based on a livestock breeding environment temperature dynamic setting model, a livestock breeding environment temperature prediction system based on a GM (1,1) model, and a grey predictive fuzzy system based on the GM (1,1), and includes following steps:

S1: determining a required temperature $T_x$ of an environment in a livestock house at time N based on the breeding temperature dynamic requirement model of the livestock, and dynamically setting, by the livestock breeding environment temperature dynamic setting model, a temperature parameter based on a model of parameters of a livestock breeding characteristic, a behavioral characteristic, a stress mechanism, a livestock breed, a quality, and an age in days;

S2: predicting a breeding environment temperature of the livestock house based on the GM (1,1) model and acquiring a predicted temperature $T_y$ of the environment in the livestock house at time N, where a system and method for predicting an environment in a livestock house by the model based on the comprehensive GM (1,1) model integrated with accumulated generating operation (AGO) of a sequence, residual model correction, and equal-dimension new information processing include the following steps: firstly, accumulating historical temperature data from a data acquisition module to generate an accumulated sequence, establishing the GM (1,1) model, and solving the model to obtain a time response function; secondly, obtaining a predicted value using the GM (1,1) model for residual test, and in combination with a changing characteristic of a residual sequence and an advantage of a residual GM (1,1) model, establishing the residual GM (1,1) model for a sequence failing to pass a model test or having low accuracy to correct the original model so as to improve accuracy of the model; thirdly, selecting a number of dimensions of a prediction model by using residual or accuracy test of the model; and finally, performing equal-dimension new information processing to establish an equal-dimension new information predicting GM (1,1) model, and repeating the test and correction of the model;

S3: determining whether the required temperature $T_x$ of the breeding environment of the livestock is equal to the predicted temperature $T_y$; if $T_x=T_y$, maintaining an original regulatory strategy of the environmental regulation implementation mechanism; and if $T_x \neq T_y$, regulating the environmental regulation implementation mechanism by the grey predictive fuzzy control system based on the GM (1,1) model, and proceeding to S4;

S4: setting a prediction error output by a livestock breeding environment prediction module and a changing rate of the prediction error as input quantities to the predictive fuzzy control module, and setting an error of input and output and a changing rate of the error as input signals to the predictive fuzzy decision-making module, determining an appropriate prediction step, establishing a fuzzy decision-making rule, establishing a grey predictive fuzzy control model based on the GM (1,1) model to determine a final output value for fuzzy control, and controlling an environmental regulatory device based on an output quantity for predictive fuzzy control; when $T_y<T_x$, the system automatically entering a heating mode; when $T_y>T_x$, the system automatically entering a wet curtain cooling mode; and causing the temperature of the livestock house to meet a livestock temperature requirement $T_x=T_y$, and repeating steps S1 and S2; and S5: determining whether the required temperature $T_x$ is equal to a measured temperature $T_c$; if $|T_x-T_c|>0.5°$ C., the system automatically entering an accumulation mode; and when a number of accumulations is more than 5, the system performing early warning, causing a breeding manager to overhaul the temperature and humidity sensor and the environmental regulation implementation mechanism according to the early warning.

The present disclosure provides a predictive control system and regulatory method for a temperature of a livestock house. Based on the livestock breeding temperature dynamic requirement model, required temperatures of the breeding environment of the livestock at different stages are determined; and based on the temperature variations in the livestock house, the variation regularity of the temperature of the livestock house is masted. A temperature prediction module is established in real time rapidly and automatically by a control module based on a small amount of temperature data output during acquisition, and equal-dimension and new-information processing is performed on the temperature data. The prediction model is automatically updated continuously with new temperature data. The temperature parameter continuously changes during prediction. The parameter of the controller changes with time. The accuracy of the prediction model is corrected using a residual model, and the implementation mechanism is regulated based on a grey predictive-fuzzy control system. A control quantity is obtained by fuzzy reasoning from a predicted value output by the grey model. The prediction error and the changing rate of the prediction error are taken as input variables to the grey predictive-fuzzy control system, allowing the control system to regulate the temperature environment in the livestock house in real time timely, and the adaptability and accuracy of regulation of the control system are improved. Moreover, trend prediction is performed on peak and valley points of the temperature of the livestock house in the present disclosure to predict the occurrence times of the peak and valley points of the temperature of the livestock house, and the system automatically enters the accumulation mode according to a difference between the required temperature and the measured temperature. A breeding manager overhauls the sensors and the environmental control implementation apparatuses according to early warning and can achieve the purpose of taking preventive measures. With the prediction function of the predictive fuzzy controller module of the present disclosure, without increasing overshoot, the predicted value reaches the set value in advance; the control quantity is reduced in advance; negative overshoot is avoided; the control effect is improved; the robustness is enhanced; and the energy consumption caused by overshoot is reduced.

The present disclosure provides a predictive control system and regulatory method for a breeding environment temperature of a livestock house (particularly a closed livestock house). The predictive control system and the regulatory method improve the temperature environment in the livestock house, improve the stability and uniformity of the temperature environment in the livestock house, reduce cold and heat stresses and a temperature fluctuation amplitude, and reduce the environmental regulation energy consumption of the livestock house.

1. For the problems that regulated temperatures of the livestock house are limited values, real-time accurate regulation can be hardly realized, and the requirements for environmental temperatures at different growth stages cannot be met, the present disclosure provides a breeding environment temperature dynamic requirement model based on parameters of a livestock breeding characteristic, a behavioral characteristic, a stress mechanism, a livestock breed, a quality, and an age in days to output the requirement parameters of the breeding environment temperature at different growth stages of the livestock. The requirements for the environmental temperature at different growth stages are determined.

2. For the problem that the control system can hardly regulate the temperature environment in the livestock house timely, based on the temperature variations in the livestock house, the variation regularity of the temperature of the livestock house is found and mastered. The control module performs rapid and automatic real-time modeling based on a small amount of temperature data output during acquisition. There is no need to manually establish a mathematical model for the temperature of the livestock house. A GM (1,N) model is established to predict a temperature value at a future point of time. The modeling means is simple. Equal-dimension new information processing is performed on the temperature data. The information in the control system is kept "fresh" in real time without increasing the amount of calculation. The accuracy of the prediction module is corrected using the residual model. The control system for the livestock house is applicable to the livestock house environment with complicated working conditions, frequent interferences, and difficulty of accurate mechanical modeling, and can realize timely regulation on the temperature environment in the livestock house.

3. For the problems of poor adaptability and low accuracy of regulation and the problem that the quality of regulation is hard to guarantee, equal-dimension new information processing is performed on the temperature data in the environmental temperature prediction module of the present disclosure. A new prediction module is established whenever a piece of new temperature data is increased, and the prediction module is automatically updated continuously with the new temperature data. The temperature parameter continuously changes during prediction, i.e., the parameter of the controller changes with time. Both dynamic and static properties of the system can be taken into account. The problem of difficult parameter adjustment in case of satisfying a response speed and tracking accuracy is solved. The environmental temperature prediction module is adaptive to random nonlinear disturbances such as variations of environmental parameters and human activities. The model is corrected using the residual model such that the accuracy of a livestock house temperature prediction model is improved. Moreover, the system control of a predictive fuzzy controller module in the present disclosure is predictive fuzzy control, and this module is adaptive to various disturbances such as the randomness, nonlinearity, non-determinacy, and the like of controlled environment and controlled parameters, and can achieve timely control with good real-time performance.

4. For the problem of failing to take preventive measures, the data acquisition module and the environmental temperature prediction module in the environmental controller of the present disclosure perform trend prediction on the peak and valley points of the temperature of the livestock house, overcome the restrictions of feedback environmental regulation for the livestock house based on detection results, predict the occurrence times of the peak and valley points of the temperature of the livestock house, and can achieve the purpose of taking preventive measures. With the predictive fuzzy controller module and the early warning and overhauling module, the system can automatically enter the accumulation mode. When the number of accumulations is greater than a specified value. The system performs early warning, causing a breeding manager to overhaul the sensor and the environmental control implementation apparatus according to the early warning, thus further achieving the purpose of taking preventive measures.

5. For the problems of high energy consumption and failing to realize energy conservation, with the prediction function of the predictive fuzzy controller module of the present disclosure, without increasing overshoot, the response time is increased; forward prediction is performed on fall response; the predicted value reaches the set value in advance; the control quantity is reduced in advance; negative overshoot is avoided; robustness of grey prediction fuzzy control is enhanced as compared with that of fuzzy control; the control effect is improved; and the energy consumption caused by overshoot is reduced.

DETAILED DESCRIPTION OF THE EMBODIMENTS

Figure 1:
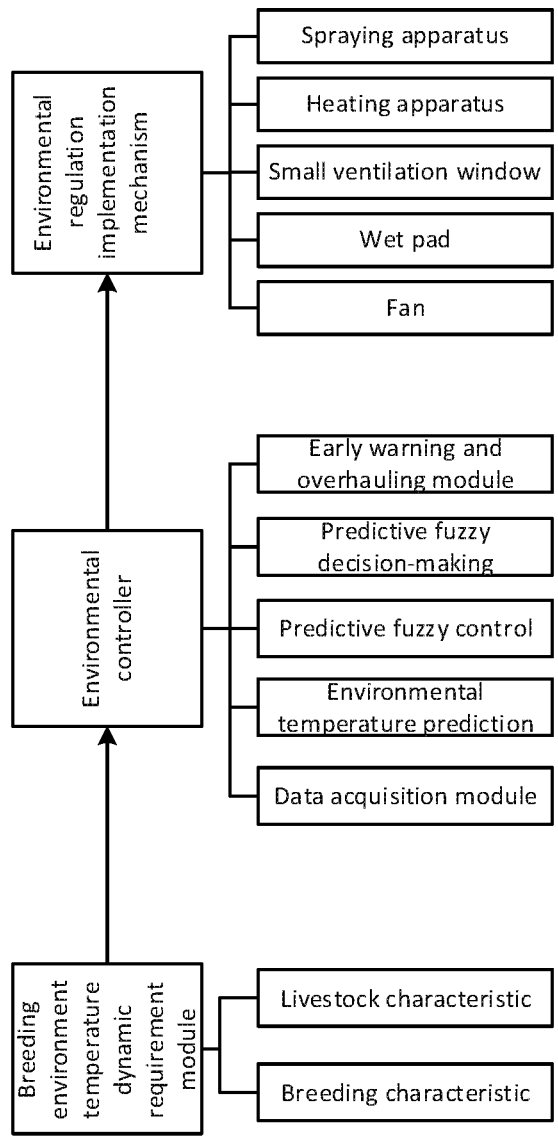
FIG. 1 is a structural schematic diagram of a predictive control system for a temperature of a livestock house.

To make the objectives, technical solutions, and advantages of the present disclosure clearer, the technical solutions in the embodiments of the present disclosure will be further described in detail below with reference to the accompanying drawings in the embodiments of the present disclosure. Reference numerals which are the same or similar throughout the accompanying drawings represent the same or similar elements or elements with the same or similar functions. The described embodiments are some rather than all of the embodiments of the present disclosure. The embodiments described below with reference to the drawings are illustrative for explaining the present disclosure and are not to be construed as limiting the present disclosure. All other embodiments derived from the embodiments of the present disclosure by a person of ordinary skill in the art without creative efforts shall fall within the protection scope of the present disclosure.

Figure 2:
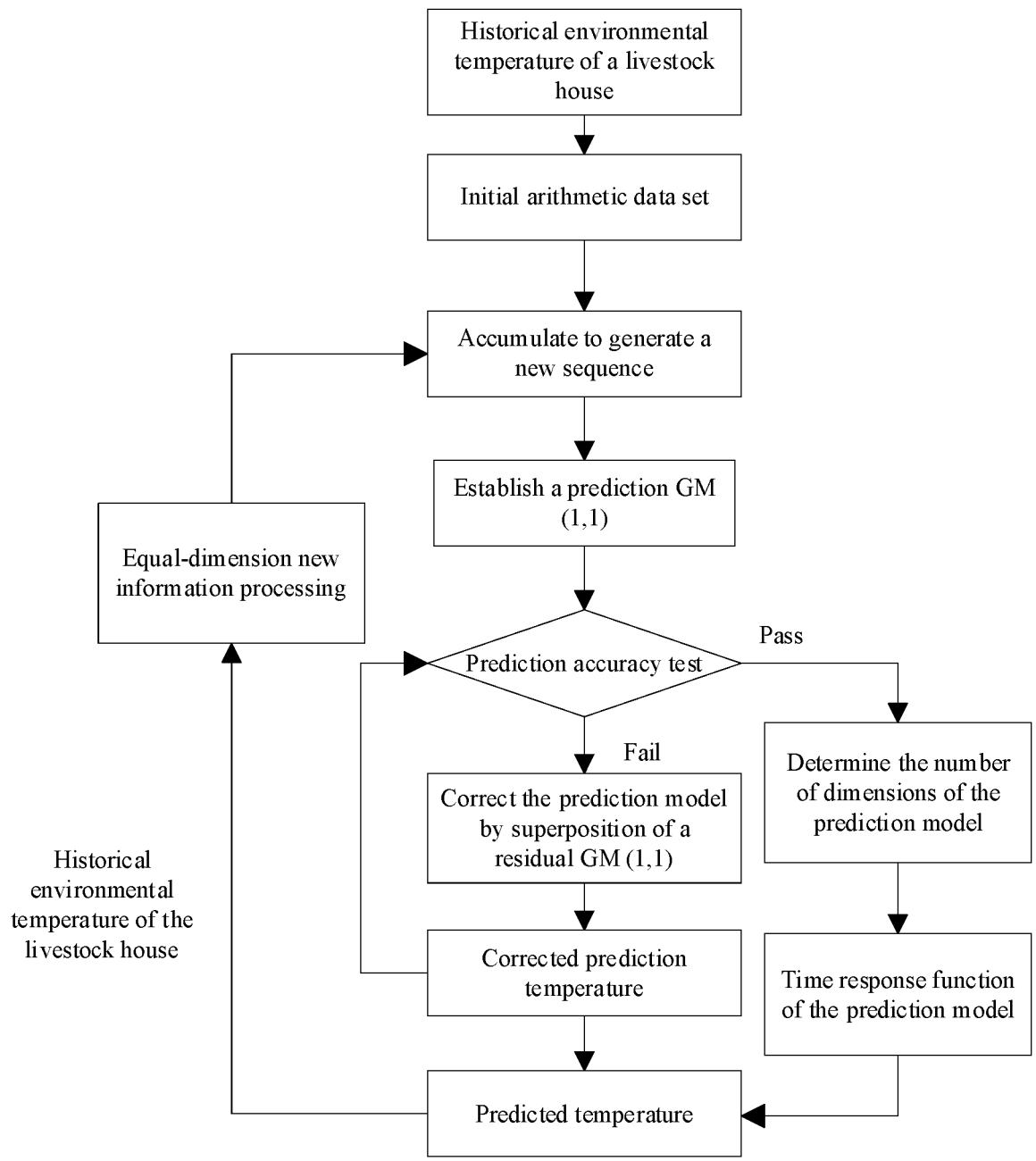
FIG. 2 is a flowchart of a method for predicting a temperature of a livestock house based on a GM (1,1)
Figure 3:
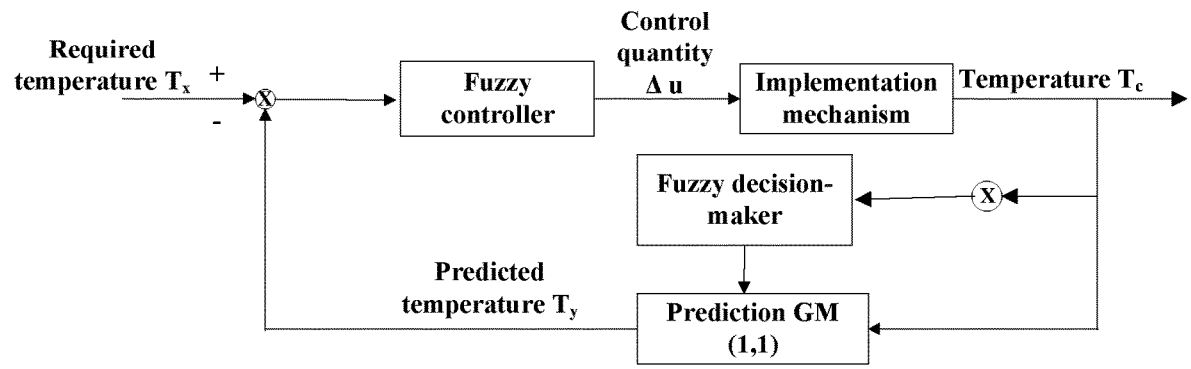
FIG. 3 is a schematic diagram of a predictive control system for a temperature of a livestock house based on a GM (1,1)

As shown in FIG. 1 to FIG. 3, the present disclosure provides a predictive control system and method for an environment in a livestock house based on a grey model GM (1,N), mainly including the following steps S1 to S5.

In step S1: a required temperature of an environment in a livestock house at time N is determined based on a livestock breeding environment temperature dynamic requirement model. High-yield breeds are mostly adopted in modern large-scale high-density livestock breeding production. The livestock has high requirements on the breeding environment and low adaptability to stresses such as temperature fluctuations of the breeding environment. The breeding environment temperatures at different growth stages of the livestock meeting requirements is the basis of guaranteeing the genetic potential and production efficiency of the livestock of high-yield breeds. In the present system, a model of parameters such as a livestock breeding characteristic, a behavioral characteristic, a stress mechanism, a livestock breed, a quality, and an age in days, to dynamically set the requirements $T_x$ for the environment temperature at different growth stages of the livestock, and control the temperature of the livestock house to be an ideal temperature $T_x$ beneficial for the livestock and making the livestock grow healthily.

In step S2: a predicted temperature $T_y$ of the environment in the livestock house at time N is predicted by a livestock temperature prediction system based on the GM (1,1).

In step (1): firstly, weather forecast values for a region where the livestock house is located from a data acquisition module of an environmental controller or environmental temperatures inside and outside the livestock house collected by temperature and humidity sensors inside and outside the livestock house are obtained as historical temperature data.

The weather forecast values for the region where the livestock house is located from the data acquisition module of the environmental controller or the environmental temperatures inside and outside the livestock house collected by the temperature and humidity sensors inside and outside the livestock house are historical data which are set as a data source. A time sequence is constructed with data at a "starting point" of time and first n data with equal time intervals as an initial arithmetic data set.

The weather forecast values for the region where the livestock house is located or the environmental temperatures inside and outside the livestock house collected by the temperature and humidity sensors inside and outside the livestock house are sampled at equal time intervals, and an original temperature sequence $T^{(0)}$ is as follows:

$$T^{(0)} = (T^{(0)}(1), T^{(0)}(2), T^{(0)}(3) \ldots T^{(0)}(n));$$

In step (2): the historical temperature data is accumulated to generate an accumulated sequence.

The historical temperature data is accumulated to generate the accumulated sequence. Accumulated generating operation (AGO) is adopted to weaken the fluctuation and randomness of a random sequence of thermal environmental parameter, thus improving the prediction accuracy of the model.

The first order-accumulated generating operator (1-AGO) is performed on the temperature sequence to weaken the influence of random interferences and obtain a new data sequence $T^{(1)}$:

$$T^{(1)} = (T^{(1)}(1), T^{(1)}(2), T^{(1)}(3) \ldots T^{(1)}(n)),$$

where, $$T^{(1)}(k) = \sum_{i=1}^{k} T^{(0)}(i), k = 1, 2, 3 \cdots \cdots m. \quad (1)$$

In step (3): the GM (1,1) is established and solved to obtain a time response function. A whitening differential equation of the GM (1,1) is established with transformed data, and the model is solved to obtain the time response function.

For $T^{(1)}$, a first-order variable differential equation is established to form the temperature prediction grey model GM (1,1), $$\frac{dT^{(1)}}{dt} + aT^{(1)} = u,$$

where $a$ and $u$ are parameters to be solved. Letting $\hat{a} = [a, u]^T$, the parameters $a$ and $u$ are solved by a method of least squares, $\hat{a} = (B^T B)^{-1} B^T Y$, where B and Y are respectively as follows:

$$B = \begin{bmatrix} -\frac{1}{2}(T^{(1)}(1) + T^{(1)}(2)) & 1 \\ -\frac{1}{2}(T^{(1)}(2) + T^{(1)}(3)) & 1 \\ \vdots & \vdots \\ -\frac{1}{2}(T^{(1)}(n-1) + T^{(1)}(n)) & 1 \end{bmatrix}$$

$$Y = [T^{(0)}(2), T^{(0)}(3), T^{(0)}(4), \ldots, T^{(0)}(m)]^T$$

Assuming $T^{(1)}(0) = T^{(0)}(1)$, when the variation of the sequence $T^{(1)}$ is smooth, the time response sequence of the GM (1,1) model is:

$$\hat{T}^{(1)}(k+1) = \left(T^{(0)}(1) - \frac{u}{a}\right)e^{-ak} + \frac{u}{a}$$

$$k = 1, 2, 3 \ldots \ldots m-1, \hat{T}^{(0)}(k+1) = \hat{T}^{(1)}(k+1) - \hat{T}^{(1)}(k),$$

and the following data sequence is obtained:

$$\hat{T}^{(1)} = (\hat{T}^{(1)}(1), \hat{T}^{(1)}(2), \hat{T}^{(1)}(3), \ldots, \hat{T}^{(1)}(n));$$

In step (4): a predicted value is obtained using the GM (1,1) for residual test. Sequence residual test and restoration sequence test are performed on a predicted temperature sequence. If the predicted value is within an accuracy range, when a simulated relative error and an average relative error are less than 1%, a mean square error ratio is less than 0.35, and a small error probability is greater than 0.95, it is considered that a livestock house temperature prediction model meets the accuracy requirement, and the predicted temperature sequence is output.

An original temperature data sequence of the livestock house is denoted by $T^{(0)}(k)$ and the predicted temperature sequence is denoted by $\hat{T}^{(1)}(k)$. A difference between $T^{(0)}(k)$ and $\hat{T}^{(1)}(k)$ is a residual sequence $\varepsilon^{(0)}(n)$, $\varepsilon^{(0)}(n) = (\varepsilon(1), \varepsilon(2)\varepsilon(3), \ldots \varepsilon(n)) = (T^{(0)}(1) - \hat{T}^{(1)}(1)T^{(0)}(2) - \hat{T}^{(1)}(2)T^{(0)}(3) - \hat{T}^{(1)}(3), \ldots, T^{(0)}(n) - \hat{T}^{(1)}(n))$.

A relative error sequence is as follows:

$$\Delta\delta(n) = \left(\left|\frac{\varepsilon(1)}{T^{(0)}(1)}\right|, \left|\frac{\varepsilon(2)}{T^{(0)}(2)}\right|, \left|\frac{\varepsilon(3)}{T^{(0)}(3)}\right|, \ldots, \left|\frac{\varepsilon(n)}{T^{(0)}(n)}\right|\right) = \{\Delta\delta\}_1^n.$$

When $k \leq n$, the simulated relative error of point k is:

$$\Delta\delta_k = \left|\frac{\varepsilon(k)}{x^{(0)}(k)}\right|,$$

and the average relative error of point k is:

$$\overline{\Delta\delta_k} = \frac{1}{n}\Sigma_{k=1}^n \Delta\delta_k.$$

A mean $\overline{x}^{(0)}$ of the original data $X^{(0)}$ is:

$$\overline{x}^{(0)} = \frac{1}{n}\Sigma_{k=1}^n x^{(0)}(k),$$

and a variance $S_1^2$ of the original data $X^{(0)}$ is:

$$S_1^2 = \frac{1}{n-1}\Sigma_{k=1}^{n}(x^{(0)}(k) - \bar{x}^{(0)})^2.$$

A mean $\bar{\varepsilon}^{(0)}$ of the residual sequence $\varepsilon^{(0)}(n)$ is:

$$\bar{\varepsilon}^{(0)} = \frac{1}{n}\Sigma_{k=1}^{n}\varepsilon^{(0)}(k);$$

and a variance $S_2^2$ of the residual sequence $\varepsilon^{(0)}(n)$ is:

$$S_2^2 = \frac{1}{n-1}\Sigma_{k=1}^{n}(\varepsilon^{(0)}(k) - \bar{\varepsilon}^{(0)})^2.$$

A variance ratio c of posterior-variance-test is:

$$c = \frac{S_2}{S_1}.$$

A small probability error value p is: $p = p\{|\varepsilon^{(0)}(k) - \bar{\varepsilon}^{(0)})| < 0.6745 S_1\}$.

An accuracy test is performed according to the calculated values of 4 indicators $\Delta\delta_k$, $\overline{\Delta\delta_k}$, c, and p.

In step (5): in combination with a changing characteristic of the residual sequence and an advantage of the residual GM (1,1), the residual GM (1,1) is established for a sequence failing to pass a model test or having low accuracy to correct the original model, so as to improve the accuracy of the model. If failing to pass the model test, a residual correction model is established. The residual sequence of the sequence having low accuracy is chosen and ranked. 1-AGO processing is performed on the residual sequence of the sequence having low accuracy to generate an accumulated sequence. A residual GM (1,N) is established and solved to obtain a time response sequence. A new residual model is obtained and superposed into the correction of the original temperature prediction model. The original model is corrected to obtain a new temperature prediction model. The prediction accuracy of the model is tested. If the accuracy requirement is met, the corrected temperature sequence is output; otherwise, correction continues until the predicted temperature sequence meets the test requirement.

When the accuracy of the established livestock house temperature prediction model GM (1,1) does not meet the environmental control requirement of the livestock house, the original model needs to be corrected. The residual sequence is utilized for modeling to improve the accuracy of the prediction model GM (1,1).

The residual sequence is: $\varepsilon^{(0)}(n) = T^{(0)}(n) - \hat{T}^{(0)}(n)$. The residual sequence of the sequence with low accuracy is chosen and ranked, and 1-AGO processing is performed to obtain sequence $\varepsilon^{(1)}(n)$. A first-order variable differential equation is established for $\varepsilon^{(1)}$ to form the residual prediction GM (1,1), $$\frac{d\varepsilon^{(1)}}{dt} + a'T^{(1)} = u',$$

where $a$ and $u$ are parameters to be solved. Letting $\hat{a}' = [a', u']^T$, the parameters $a'$ and $u'$ are solved by the method of least squares, $\hat{a}' = (B^T B)^{-1} B^T Y$, where B and Y are respectively as follows:

$$B = \begin{bmatrix} -\frac{1}{2}(\varepsilon^{(1)}(1) + \varepsilon^{(1)}(2)) & 1 \\ -\frac{1}{2}(\varepsilon^{(1)}(2) + \varepsilon^{(1)}(3)) & 1 \\ \vdots & \vdots \\ -\frac{1}{2}(\varepsilon^{(1)}(n-1) + \varepsilon^{(1)}(n)) & 1 \end{bmatrix}$$

$$Y = [\varepsilon^{(0)}(2), \varepsilon^{(0)}(3), \varepsilon^{(0)}(4), \ldots\ldots, \varepsilon^{(0)}(m)]^T$$

The time response function of the residual model is $$\hat{\varepsilon}^{(0)}(k) = (-a')\left(\varepsilon'^{(0)}(1) - \frac{u'}{a'}\right)e^{-a'k}.$$

For ease of expression, the time response function is rewritten as $$\hat{\varepsilon}^{(0)}(k+1) = (-a')\left(\varepsilon'^{(0)}(1) - \frac{u'}{a'}\right)e^{-a'k}.$$

The reciprocal of the time response function $\hat{T}^{(1)}(k+1)$ of the livestock house temperature prediction model is corrected. When $$\hat{T}^{(1)}(k+1) = \left(T^{(0)}(1) - \frac{u}{a}\right)e^{-ak} + \frac{u}{a},$$

$$k = 1, 2, 3 \ldots \ldots m-1, T^{(0)}(k+1) = (-a)\left(T^{(0)}(1) - \frac{u}{a}\right)e^{-ak}.$$

The residual GM (1,N) model, $\hat{\varepsilon}^{(0)}(k'+1)$, is added to the original prediction model for correction to derive $$\hat{x}^{(0)}(k+1) = (-a)\left(T^{(0)}(1) - \frac{u}{a}\right)e^{-ak} + \vartheta(k-i)(-a')\left(\varepsilon'^{(0)}(1) - \frac{u'}{a'}\right)e^{-a'k},$$

$$\text{where } \vartheta(k-i) = \begin{cases} 1, & k \geq i \\ 0, & k < i \end{cases}.$$

In step (6): the number of dimensions of the prediction model is selected by the residual or accuracy test of the model. The number of dimensions m are selected by the residual or accuracy test of the model, and a smaller average absolute error is preferred. The smaller average absolute error is $$MAPE(\%) = \frac{1}{n}\Sigma_{k=1}^{n}\left|\frac{\hat{x}_1^{(0)}(k) - \hat{x}_1^{(0)}(k)}{\hat{x}_1^{(0)}(k)}\right|.$$

When the average absolute error is minimum, namely $$\min_{1 \leq m \leq n} MAPE(\%) = \frac{1}{n}\Sigma_{k=1}^{n}\left|\frac{\hat{x}_1^{(0)}(k) - \hat{x}_1^{(0)}(k)}{\hat{x}_1^{(0)}(k)}\right|,$$

the value of m is the number of dimensions of the prediction model.

In step (7): equal-dimension new information processing is performed to establish an equal-dimension new information predicting GM (1,1) model, and testing and correction of the model are repeated. With increasing of the livestock house temperature sequence, the predicted temperatures obtained by the temperature prediction model in last step are ranked according to the time sequence. The arithmetic data set is updated. Equal-dimension processing is performed on the sequence to obtain an equal-dimension new information sequence, and the equal-dimension new information GM (1,1) model is established. The steps (3), (4), and (5) are repeated.

In the livestock house temperature prediction GM (1,1) model, equal-dimension new information processing is performed on $T^{(0)}=(T^{(0)}(1), T^{(0)}(2), T^{(0)}(3), \ldots, T^{(0)}(n-1), T^{(0)}(n))$. $T^{(0)}(1)$ is removed and $T^{(0)}(n+1)$ is added to obtain: $T^{(0)}=(T^{(0)}(2), T^{(0)}(3), \ldots, T^{(0)}(n-1), T^{(0)}(n), T^{(0)}(n+1))$.

An output sequence at time $t_i$ is $T_i$, $T_i=(T_i(1), T_i(2), T_i(3), \ldots, T_i(n))$, and an output sequence at time $t_{i+1}$ is $T_{i+1}$, $T_{i+1}=(T_{i+1}(1), T_{i+1}(2), T_{i+1}(3), \ldots, T_{i+1}(n))$; and it is maintained that $T_{i+1}(k)=(k+1)$ and $T_{i+1}(n-1)=T_i(n)$.

1-AGO is performed on the data sequence after the equal-dimension new information processing to generate a new sequence. The first-order variable differential equation is established to form the temperature prediction GM (1,1), $$\frac{dT^{(1)}}{dt} + a_{i+1}T^{(1)} = u_{i+1},$$

where $a_{i+1}$ and $u_{i+1}$ are parameters to be solved. Letting $\widehat{a_{i+1}} = [a_{i+1}, u_{i+1}]^T$, the parameters $a_{i+1}$ and $u_{i+1}$ are solved by the method of least squares, $$\widehat{a_{i+1}} = (B_{i+1}^T B_{i+1})^{-1} B_{i+1}^T Y_{i+1,N},$$

where $B_{i+1}$ and $Y_{i+1,N}$ are respectively as follows:

$$\begin{bmatrix} a_{i+1} \\ u_{i+1} \end{bmatrix} = (B_{i+1}^T B_{i+1})^{-1} B_{i+1}^T Y_{i+1,N}$$

$$B_{i+1} = \begin{bmatrix} -\frac{1}{2}(T_i^{(1)}(2) + T_i^{(1)}(3)) & 1 \\ -\frac{1}{2}(T_i^{(1)}(3) + T_i^{(1)}(4)) & 1 \\ \vdots & \vdots \\ -\frac{1}{2}(T_i^{(1)}(n) + T_{i+1}^{(1)}(n)) & 1 \end{bmatrix}$$

$$Y_{i+1,N} = \begin{bmatrix} T_i^{(0)}(3) \\ T_i^{(0)}(4) \\ \ldots \\ T_{i+1}^{(0)}(n) \end{bmatrix}$$

The corresponding time response model is:

$$\hat{T}_{i+1}^{(1)}(k+1) = \left(\hat{T}_{i+1}^{(1)}(0) - \frac{u_{i+1}}{a_{i+1}}\right)e^{-a_i k} + \frac{u_{i+1}}{a_{i+1}},$$

k=1, 2, 3 . . . m−1. The predicted output value of step m of the system is $$\hat{T}^{(1)}(k+m) = \left(T^{(0)}(k-n+1) - \frac{u}{a}\right)e^{-a(k-n+1)} + \frac{u}{a},$$

$$k = 1, 2, 3 \ldots \ldots m-1.$$

In step (8): step (7) is repeated. By a recursive method, the predicted temperature value at time m is output in sequence. The equation $\hat{T}^{(0)}(k+1)=\hat{T}^{(1)}(k+1)-\hat{T}^{(1)}(k)$ is utilized to obtain the predicted value of the original sequence:

$$\hat{T}^{(0)}(k+1) = \hat{T}^{(1)}(k+1) - \hat{T}^{(1)}(k) = \left[\left(T^{(0)}(1) - \frac{\hat{u}}{\hat{a}}\right)e^{-\hat{a}k}(1 - e^{-\hat{a}})\right].$$

In step S3: whether the required temperature $T_x$ of the environment in the livestock house is equal to the predicted temperature $T_y$ is determined; if $T_x=T_y$, an original regulatory strategy of an environmental regulation implementation mechanism is maintained; and if $T_x \neq T_y$, the environmental regulation implementation mechanism is regulated by the grey predictive fuzzy control system based on a GM (1,1) model.

S4: the grey predictive fuzzy control system based on a GM (1,1) model obtains a control quantity from the predicted value output from the grey model by fuzzy reasoning. A prediction error and a changing rate of the prediction error are taken as input variables to the grey predictive fuzzy control system. The prediction error $\hat{E}(t_i+m)$ and the changing rate $\Delta\hat{E}(t_i+m)$ of the prediction error are $\hat{E}(t_i+m)=T_{set}(t_i+m)-\hat{T}^{(0)}(t_i+m)$ and $\Delta\hat{E}(t_i+m)=\hat{E}(t_i+m)-\hat{E}(t_i+m-1)$, respectively. An advanced control quantity of the system is determined to perform advanced control on the controlled object. The prediction error $\hat{E}(t_i+m)$, the changing rate $\Delta\hat{E}(t_i+m)$ of the prediction error, and the control quantity $\Delta U(t_i)$ are normalized to a basic domain with a scaling factor, and a corresponding fuzzy subset is defined. A fuzzy decision-making rule is established, and Mamdani reasoning method is adopted for a control rule to determine the adaptability of the rule. A weighted average defuzzifying algorithm is utilized. The membership functions of the input and output of a fuzzy controller are both triangular. The calculation is simple and less space is occupied. Adjacent fuzzy numbers cross at a membership angle equal to ½, and there are two rules at most at a certain time to determine the output of the controller. Quantization levels of the prediction error, the error variation, and the control quantity are 7 levels. An appropriate prediction step is determined. A final output value of fuzzy control is determined. The operation and switching of corresponding ventilation modes, and devices such as a wet curtain cooling system, a heating device, a small window in a side wall are controlled such that the temperature $T_x=T_y=T_c$ of the livestock house meets the requirement.

S5: whether the required temperature $T_x$ is equal to a measured temperature $T_c$ is determined; if $|T_x-T_c|>0.5°$ C., the system automatically enters an accumulation mode; and when the number of accumulations is more than 5, the system performs early warning, causing a breeding manager to overhaul a sensor and an environmental regulation implementation apparatus according to the early warning.

EXAMPLE

A predictive control example for a temperature of a livestock house in a farm in Rizhao of Shandong is selected for analysis. Predicted values and errors of the temperature of the livestock house under different dimensions are as shown in Table 1. In the study of this example, the number of dimensions of the grey predictive model for the temperature is selected to be 7, and the whitening differential equation of the time response sequence of the GM (1,1) is obtained as follows:

$\hat{T}^{(1)}(k+1)=(x)^{(0)}(1)-1913.5)e^{-0.013k}+1913.5$ k=1, 2, 3 . . . m−1. The predicted value of the temperature sequence of the chicken house may be:

$$\hat{T}^{(0)}(k+1) = \hat{T}^{(1)}(k+1) - \hat{T}^{(1)}(k) = \left[\left(T^{(0)}(1) - \frac{\hat{u}}{\hat{a}}\right)e^{-\hat{a}k}\left(1 - e^{-\hat{a}}\right)\right].$$

Figure 4:
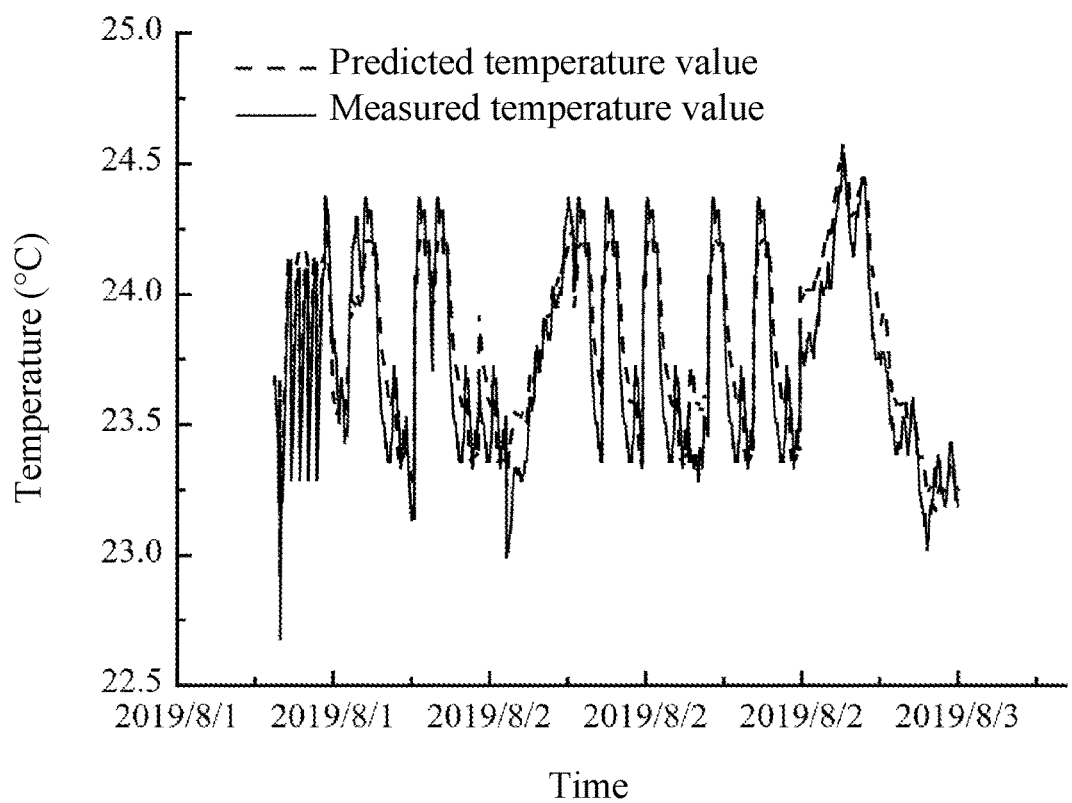
FIG. 4 is a diagram illustrating comparison curves of a measured value and a predicted value of a temperature of a livestock house.
Figure 5:
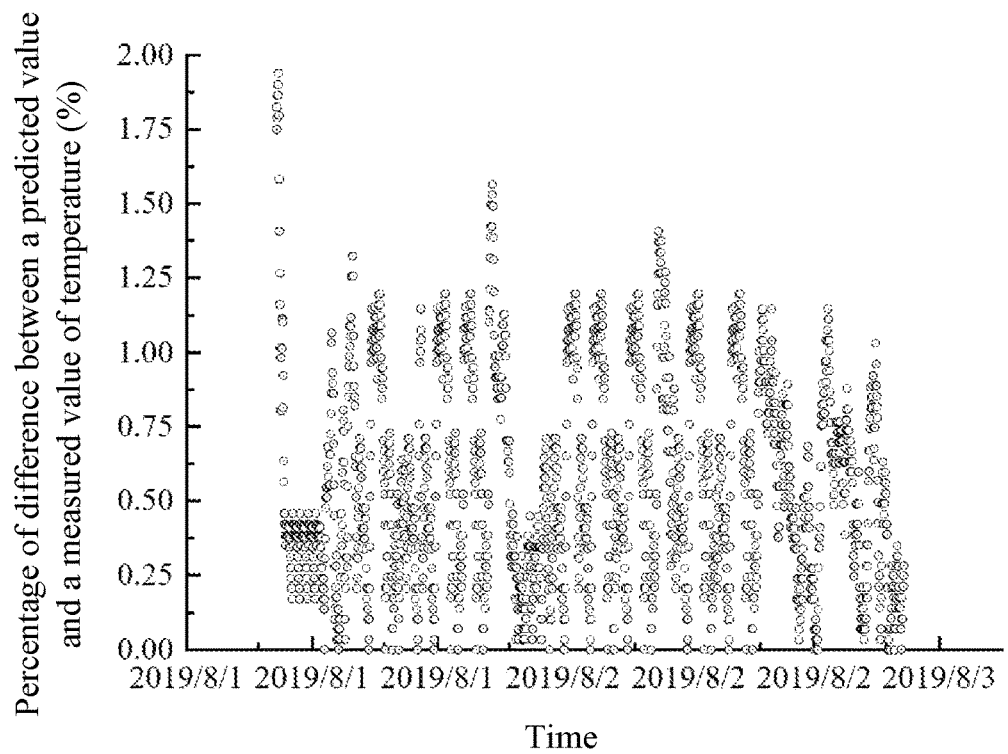
FIG. 5 is a percentage map of a difference between a measured value and a predicted value of a temperature of a livestock house.
Figure 6:
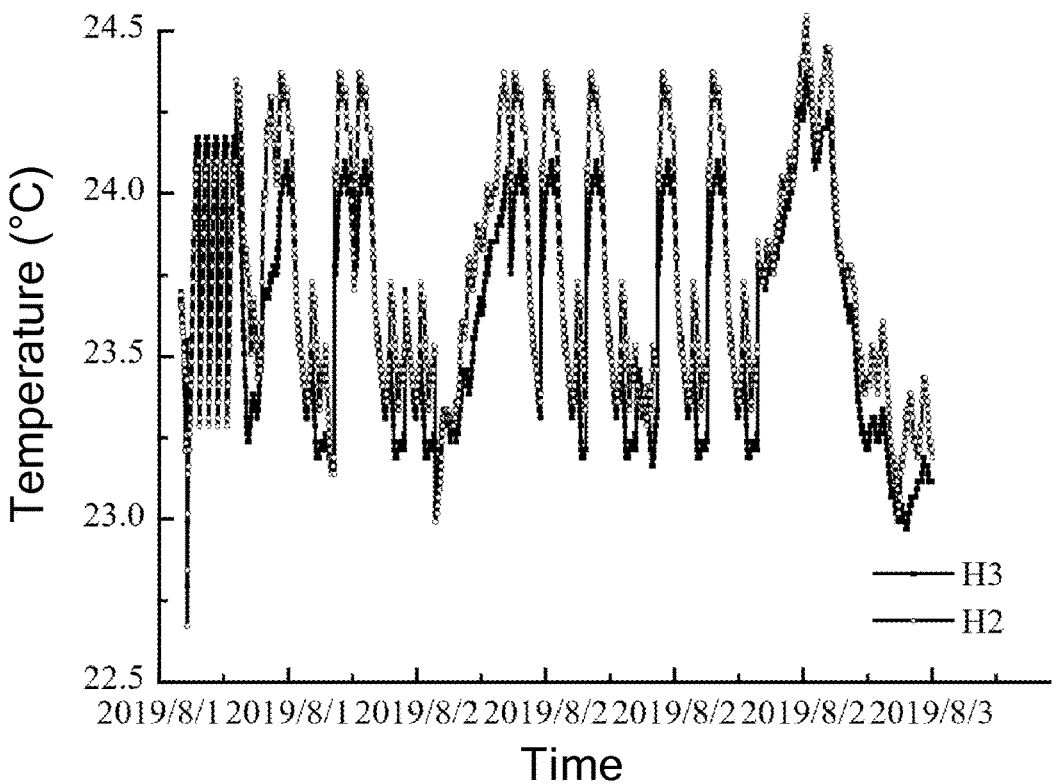
FIG. 6 is a diagram illustrating a variation curve of a temperature of a livestock house under predictive control.

The environmental control level and the regulatory strategy parameters of the experimental house in this example are as shown in Table 1. The predicted value $\hat{x}^{(0)}(k+1)$ is utilized in system control decision-making. The variations of the measured values and the predicted values of the temperature at measurement points of the experimental house are as shown in FIG. 4. As can be seen from the figure, the maximum difference between the measured value and the predicted value of the temperature in the chicken house is 0.5° C., and there is no significant difference between the measured value and the predicted value of the temperature of the chicken house (P>0.05). The percentages of the temperature differences between the measured values and the predicted values are as shown in FIG. 5. The percentages of the differences between the measured values and the predicted values of the temperature ranges from 0 to 1.9%. The variation trends of the predicted values and the measured values of the temperature are consistent, and the predicted values of the temperature may well express the variation trend of the temperature of the chicken house. As shown in FIG. 6, the environment of the chicken house is regulated using the grey predictive control strategy for the temperature. The maximum and minimum temperature differences between different measurement positions are 1° C. and 0° C., respectively. Under the predictive control, the system shock and overshoot are weakened.

TABLE 1

Experimental Environmental Control Level and Strategy Parameters

| Predicted Temperature (° C.) | Level | Air Volume (* $10^3$ m³/h) |
|---|---|---|
| 19.5 ± 0.5 | D1 | 70 |
| 20.1 ± 0.6 | D2 | 105 |
| 20.8 ± 0.7 | D3 | 140 |
| 21.6 ± 0.8 | D4 | 175 |
| 22.1 ± 1.0 | D5 | 210 |
| 24.1 ± 1.5 | D6 | 280 |
| 25.6 ± 1.5 | D7 | 350 |
| 27.1 ± 1.5 | D8 | 420 |
| 29.1 ± 2.0 | D9 | 560 |
| 31.4 ± 2.3 | D10 | 700 |
| 33.8 ± 2.4 | D11 | 910 |
| 36.8 ± 3.0 | D12 | 1015 |

Finally, it needs to be noted that the foregoing embodiments are only used to explain the technical solutions of the present disclosure, and are not intended to limit the same. Although the present disclosure is described in detail with reference to the foregoing embodiments, those of ordinary skill in the art should understand that the technical solutions described in the foregoing embodiments may still be modified, or some technical features may be equivalently replaced. Such modifications or replacements do not make the essence of the corresponding technical solutions deviate from the spirit and scope of the corresponding technical solutions of the embodiments of the present disclosure.

What is claimed is:

1. A regulatory method, based on a predictive control system for a temperature of a livestock house that comprises a temperature and humidity sensor, a breeding environment temperature dynamic requirement module, an environmental controller, and an environmental regulation implementation mechanism, wherein the environmental controller is connected to the breeding environment temperature dynamic requirement module and the temperature and humidity sensor; and the environmental regulation implementation mechanism is connected to the environmental controller and is configured to perform a corresponding environmental regulation according to a command from the environmental controller;

wherein the environmental controller comprises a data acquisition module, an environmental temperature prediction module, a predictive fuzzy control module, a predictive fuzzy decision-making module, and an early warning and overhauling module;

wherein the regulatory method comprises:

controlling a temperature of a breeding environment based on a livestock breeding environment temperature dynamic setting model, a livestock breeding environment temperature prediction system based on a grey model (GM) (1,1), and a grey predictive fuzzy system based on the GM (1,1), and comprises following steps:

(S1) determining a required temperature $T_x$ of an environment in a livestock house at time N based on the breeding temperature dynamic requirement model of the livestock; and dynamically setting, by the livestock breeding environment temperature dynamic setting model, a temperature parameter based on a model of parameters of a livestock breeding characteristic, a behavioral characteristic, a stress mechanism, a livestock breed, a quality, and an age in days;

(S2) predicting a breeding environment temperature of the livestock house based on the GM (1,1); and acquiring a predicted temperature $T_y$ of the environment in the livestock house at time N, wherein a system and method for predicting an environment in a livestock house by the model based on a comprehensive GM (1,1) integrated with accumulated generating operation (AGO) of a sequence, residual model correction, and equal-dimension new information processing comprise the following steps:

accumulating historical temperature data from a data acquisition module to generate an accumulated sequence, establishing the GM (1,1), and solving the model to obtain a time response function;

obtaining a predicted value using the GM (1,1) for residual test, and in combination with a changing characteristic of a residual sequence and an advantage of a residual GM (1,1), establishing the residual GM (1,1) for a sequence failing to pass a model test or having low accuracy to correct the original model;

selecting a number of dimensions of a prediction model by using a residual or accuracy test of the model; and performing equal-dimension new information processing to establish an equal-dimension new information predicting GM (1,1), and repeating the test and correction of the model;

(S3) determining whether the required temperature $T_y$ of the breeding environment of the livestock is equal to the predicted temperature $T_y$, wherein if $T_x=T_y$, maintaining an original regulatory strategy of the environmental regulation implementation mechanism and wherein if $T_x \neq T_y$, regulating the environmental regulation implementation mechanism by the grey predictive fuzzy control system based on the GM (1,1), and proceeding to (S4); and (S4) setting a prediction error output by a livestock breeding environment prediction module and a changing rate of the prediction error as input quantities to the predictive fuzzy control module;

setting an error of input and output and a changing rate of the error as input signals to the predictive fuzzy decision-making module;

determining an appropriate prediction step;

establishing a fuzzy decision-making rule;

establishing a grey predictive fuzzy control model based on the GM (1,1) to determine a final output value for fuzzy control; and controlling an environmental regulatory device based on an output quantity for predictive fuzzy control, wherein if $T_y<T_x$, the system automatically enters a heating mode, and wherein if $T_y>T_x$, the system automatically enters a wet curtain cooling mode; and causing the temperature of the livestock house to meet a livestock temperature requirement $T_x=T_y$, and repeating steps (S1) and (S2); and (S5) determining whether the required temperature $T_y$ is equal to a measured temperature $T_c$, wherein if $|T_x-T_c|>0.5°$ C., the system automatically enters an accumulation mode and wherein when a number of accumulations is more than 5, the system performs early warning, triggering an overhaul of the temperature and humidity sensor and the environmental regulation implementation mechanism according to the early warning.

2. The regulatory method according to claim 1, wherein the environmental temperature prediction module is connected to the data acquisition module, and is configured to output a predicted temperature of a breeding environment in a livestock house at time N based on the comprehensive GM (1,1) integrated with accumulated generating operation (AGO) of a sequence, residual model correction, and equal-dimension new information processing;

the predictive fuzzy control module is connected to the environmental temperature prediction module, wherein input signals to the predictive fuzzy control module are a prediction error for the temperature of the breeding environment in the livestock house and a changing rate of the prediction error; a fuzzy decision-making rule is established to determine an output quantity for predictive fuzzy control, and the environmental regulation implementation mechanism is configured to perform control and regulation based on the output quantity for predictive fuzzy control;

the predictive fuzzy decision-making module is connected to the predictive fuzzy control module, wherein input signals to the predictive fuzzy decision-making module are an error of the predicted temperature and the output quantity and a changing rate of the error, and an appropriate prediction step is determined; and the early warning and overhauling module is configured to give an early warning based on a number of deviation accumulations, and is connected to the breeding environment temperature dynamic requirement module, the temperature and humidity sensor, and the data acquisition module.

3. The regulatory method according to claim 1, wherein the breeding environment temperature dynamic requirement module is connected to the data acquisition module.

4. The regulatory method according to claim 1, wherein the environmental regulation implementation mechanism comprises a fan, a wet curtain, a small ventilation window, a heating apparatus, and a spraying device, and is configured to control ventilation, cooling, heating, and humidification of the breeding environment of the livestock according to commands from the environmental controller.

5. The regulatory method according to claim 1, wherein a number of temperature and humidity sensors is more than or equal to two, which are disposed inside and outside the livestock house, respectively.

* * * * *